United States Patent [19]

Davidson et al.

[11] 4,317,217
[45] Feb. 23, 1982

[54] TAG GENERATOR FOR A SAME-FREQUENCY REPEATER

[75] Inventors: Allen L. Davidson, Crystal Lake; Jona Cohn, Morton Grove, both of Ill.

[73] Assignee: Motorola, Inc., Schaumburg, Ill.

[21] Appl. No.: 176,895

[22] Filed: Aug. 11, 1980

[51] Int. Cl.³ .............................................. H04B 7/14
[52] U.S. Cl. ......................................... 455/24; 455/22
[58] Field of Search .............................. 455/20, 22, 24

[56] References Cited

U.S. PATENT DOCUMENTS

| 2,671,850 | 3/1954 | Marcou | 455/22 |
| 2,875,328 | 2/1959 | Hare et al. | 455/24 |
| 3,696,429 | 10/1972 | Tressa | 455/24 |

*Primary Examiner*—Jin F. Ng
*Attorney, Agent, or Firm*—Donald P. Reynolds; Edward M. Roney; James W. Gillman

[57] ABSTRACT

Spillover of RF signal from the output of a same-frequency repeater to the input is reduced by attaching a tag to the output signal. The tag is double-sideband, suppressed carrier to place two spectral spikes, one above and one below the carrier. The tag is applied to the signal in the IF. A tagged signal of variable amplitude and phase is added to the received signal so as to cancel the tag and hence the spillover signal, leaving only the desired signal. A feedback system controls the amplitude and phase of the cancelling signal.

5 Claims, 4 Drawing Figures

TAG GENERATOR FOR A SAME-FREQUENCY REPEATER

BACKGROUND OF THE INVENTION

This invention relates to same-frequency repeaters.

A same-frequency repeater (SFR) is a device that receives a radio broadcast signal at a particular frequency and at a relatively low power level and rebroadcasts the received signal at the same or nearly the same frequency but at a much higher power level. This is in contrast to repeaters that are in more common use in which the signal is typically rebroadcast at a frequency different enough from the received frequency so that there is essentially no spectral overlap. The term single-frequency repeater is also used. The use of such different frequencies makes it relatively easy to effect electrical isolation of the high-power transmitted signal from the input stages that are adapted to receive low-power signals. The principal cost of this advantage is that twice the spectrum is required for a system that operates at two frequencies. The SFR minimizes the amount of spectrum used but creates the problem of spillover. This is the term applied to that portion of the transmitted signal that is received in the input to the SFR. Spillover is also referred to as leakage or blowover. Since the amplification in a repeater may easily reach 160 or 170 db, the spillover that is detected at the receiving antenna may be down many db from the transmitted signal and still interfere with the received signal.

The presence of spillover within 10 dB of the desired input signal to an SFR may lead to several bad results. There will, of necessity, be a time delay in processing a signal through an SFR. Such a time delay can be of the order of 100 microseconds. If the signal is voice-modulated and both the signal and its delayed spillover are rebroadcast, the resulting signal is greatly distorted. If the signal carries digital data, a delay of more than one-third of a bit width loses intelligibility. This is about 30 microseconds for a bit rate of 12 KHz. If the spillover frequency is received at a sufficiently large magnitude, there is the possiblity of oscillation in the repeater. If the spillover is significantly stronger than the received signal, the received signal will be lost. It is evident that if the spectrum conservation of SFR is to be achieved, spillover from the output into the input must be controlled.

One known way to control spillover is to combine a tag signal with the transmitted signal so that the spillover is tagged. The use of a feedback system to minimize detected tag in the input can control the amplitude and phase of a sample of the transmitted signal so that its addition to the input cancels spillover. Such control is difficult to implement for broadcast frequencies of 40 MHz and higher.

It is an object of the present invention to provide a method and means of controlling spillover in an SFR.

It is a further object of the present invention to apply a double-sideband suppressed-carrier signal as a tag on the broadcast signal of an SFR.

It is a further object of the present invention to effect cancellation of spillover in an SFR by minimizing detected tag signal in the IF frequency.

Other objects will become apparent in the course of a detailed description of the invention.

SUMMARY OF THE INVENTION

Spillover of RF signal from the output of a same-frequency repeater to the receiving port is controlled by amplitude-modulating a signal to be broadcast in the SFR with a sinusoid to generate two tag components, one above and one below the carrier frequency of the signal. The modulation is applied at an intermediate frequency. A cancelling signal that is variable in amplitude and phase and that contains the tag is added to the signal received at the receiving antenna, and the sum is tested for the presence of tag frequencies. Amplitude and phase of the cancelling signal are adjusted in a feedback loop to minimize the presence of tag components and, hence, of spillover. The system is also operable when the signal to be broadcast differs in frequency from the received signal by an amount insufficient to provide adequate isolation through system frequency selectivity.

DETAILED DESCRIPTION OF THE INVENTION

Figure 1:
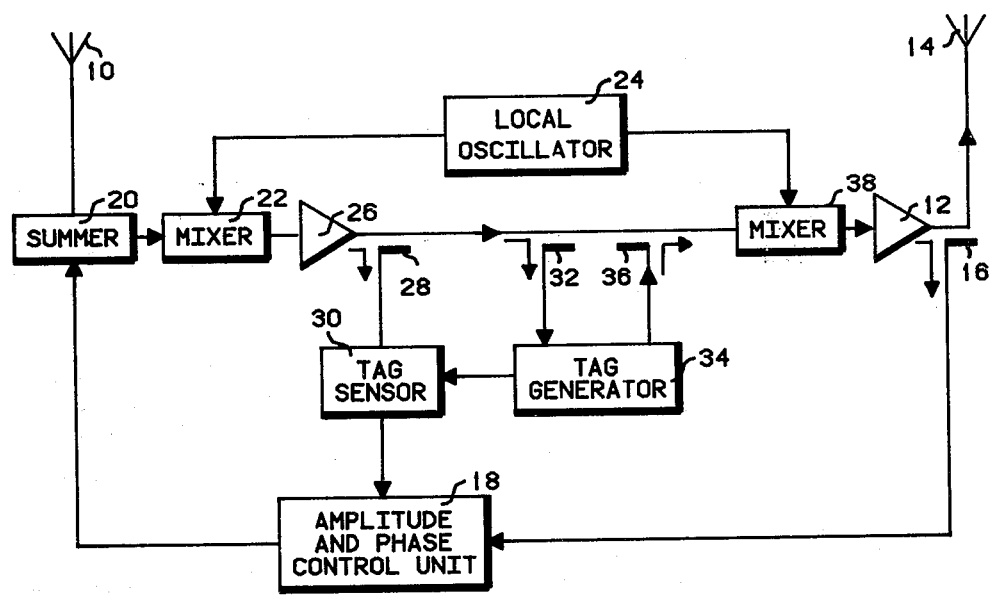
FIG. 1 is a block diagram of a circuit for the practice of the present invention.

FIG. 1 is a functional block diagram of a circuit for the practice of the present invention. In FIG. 1, a receiving antenna 10, an RF amplifier 12 and a transmitting antenna 14 are all the parts that would be necessary to make an SFR if spillover were not a problem. In that case, receiving antenna 10 could be connected to RF amplifier 12 and the amplified output of RF amplifier 12 could be rebroadcast on transmitting antenna 14. In practice, however, some of the signal broadcast from transmitting antenna 14 is received at receiving antenna 10. If antennas 12 and 14 are combined, spillover will be leakage through a circulator or the like. Therefore, in the practice of the present invention, the signal that is sent from RF amplifier 12 to transmitting antenna 14 is sampled at directional coupler 16 and the sample is sent to amplitude and phase control unti 18. The output of amplitude and phase control unit 18 is a signal that is proportional to the sampled signal but that may differ from it in amplitude, phase or both. The signal from amplitude and phase control unit 18 is taken to summer 20 in which it is added to the signal received on receiving antenna 10. The output of summer 20 is coupled to mixer 22 in which it is mixed with the signal from local oscillator 24. The difference frequency from mixer 22 is amplified in IF amplifier 26, which may include one or more stages of automatic gain control in addition to one or more stages of amplification at fixed gain.

The amplified signal from IF amplifier 26 is connected through a directional coupler 28 to tag sensor 30 and through a directional coupler 32 to tag generator 34. Tag generator 34 produces a signal that is amplitude-modulated at a frequency in the audio band and that is double sideband, suppressed carrier. If the modulating frequency is 200 Hz, for example, the spectrum of this signal is two near spikes 200 Hz above and below the carrier frequency. These are the tags that are added to the output from IF amplifier 26 in directional coupler 36. The resultant signal is mixed with the output of local oscillator 24 in mixer 38 to produce a signal at the received frequency. That signal is amplified in RF amplifier 12 for broadcast by transmitting antenna 14. Transmitting antenna 14 is here shown as separate from receiving antenna 10, but the output of RF amplifier 12 could also be connected through a circulator to be broadcast from receiving antenna 10. This is a matter of design choice.

The tag signals from tag generator 34 are also coupled to tag sensor 30 for comparison with the tag in the received signal. An output that is a function of the detected amount of tag passed by directional coupler 28 is coupled to amplitude and phase control unit 18 to vary the amplitude and phase of a signal derived from the signal coupled from directional coupler 16. The output signal from amplitude and phase control unit 18 is added in summer 20 to the signal received on receiving antenna 10. Amplitude and phase control unit 18 is adjusted by tag sensor 30 to set an amplitude and phase that will minimize the amount of tag that is received by tag sensor 30. Cancellation of the tag cancels most of the blowover signal from transmitting antenna 14 that is detected at receiving antenna 10. It should be evident that the system would work equally as well if mixer 38 were connected to a separate oscillator to generate a different frequency for broadcast.

Figure 2:
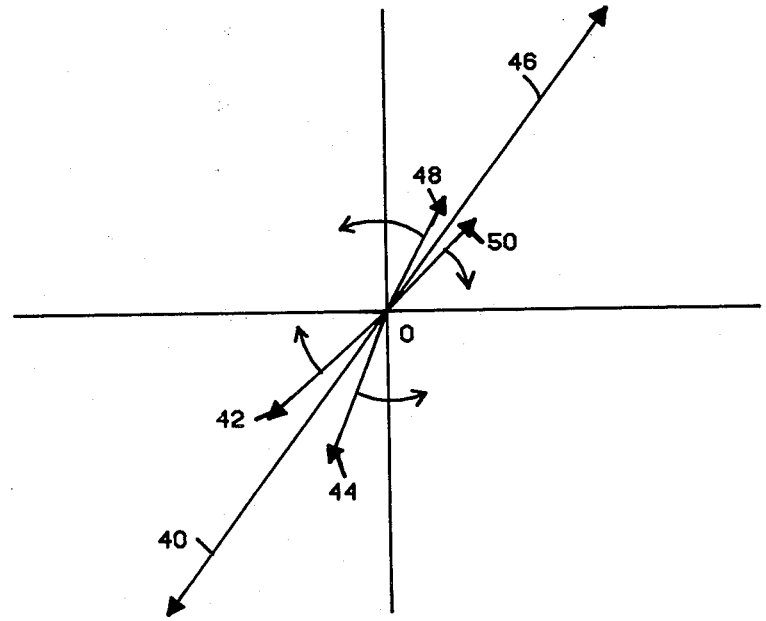
FIG. 2 is a phasor diagram of selected signals in the circuit of FIG. 1.

The principle of operation of the present invention will become apparent from a consideration of FIG. 2 which is a phasor diagram representing every voltage that is added at summer 20 of FIG. 1 except for the desired voltage. In FIG. 2, phasor 40 represents the leakage signal that is received by receiving antenna 10 of FIG. 1. Because the leakage signal has been broadcast from transmitting antenna 14 of FIG. 1, or else leaked in a circulator, it contains two tags. One of these tags is represented by phasor 42 and the other, by phasor 44. Phasor 42 is indicated as rotating clockwise and phasor 44 is indicated as rotating counterclockwise. This results from the fact that the time signals that these phasors represent are respectively below and above the frequency of the time signal represented by phasor 40. Regardless of their relative position in the phasor diagram at any given time, phasors 42 and 44 will make equal angles with phasor 40. Similarly, phasor 46 represents the cancelling signal. The objective of the apparatus of the present invention is to assure that cancelling signal 46 is equal in amplitude and opposite in phase to the signal represented by phasor 40. Phasor 46 is associated with two cancelling tags represented by phasors 48 and 50. As before, phasor 48 has apparent rotation counterclockwise, and phasor 50 has apparent rotation clockwise with respect to phasor 46. Thus, phasor 48 represents a tag that is higher in frequency than the sinusoid represented by phasor 46, and phasor 50 represents a sinusoid that is lower in frequency. The feedback network of FIG. 1 operates to minimize the phasor sum of phasors 42, 44, 48 and 50. In so doing, the feedback network also achieves the principal objective of minimizing the phasor sum of phasors 40 and 46.

It should be noted that the corresponding tag phasors of FIG. 2 are not in general collinear. This results from the fact that time delay through the system operates on the leakage tags represented by phasors 42 and 44, while the cancelling tags represented by phasors 48 and 50 are not identically so delayed. However, because of the symmetry of the sidebands about the carrier frequency, the phasor sum of phasors 42 and 44 will always lie on phasor 40 or its negative extension. Similarly, the phasor sum of phasors 48 and 50 will always lie on the line of phasor 46 or its negative extension. It follows that the result of the phase shift through the repeater is cancelled in that minimizing the phasor sum of phasors 42, 44, 48 and 50, the tags, produces complete cancellation of phasor 40 by phasor 46.

Figure 3A:
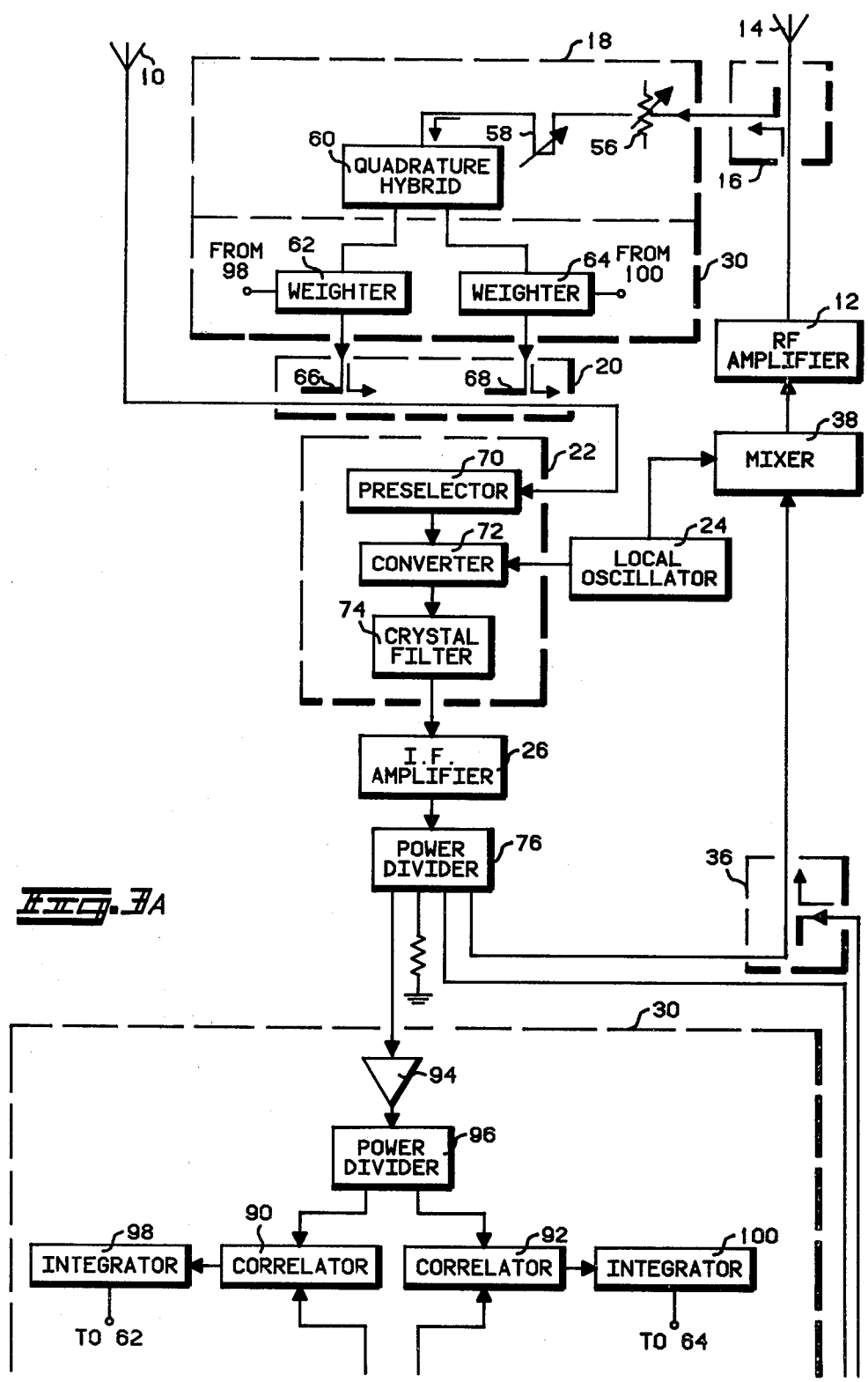
FIG. 3, including A and B, is a detailed circuit diagram of a circuit for the practice of the present invention.
Figure 3B:
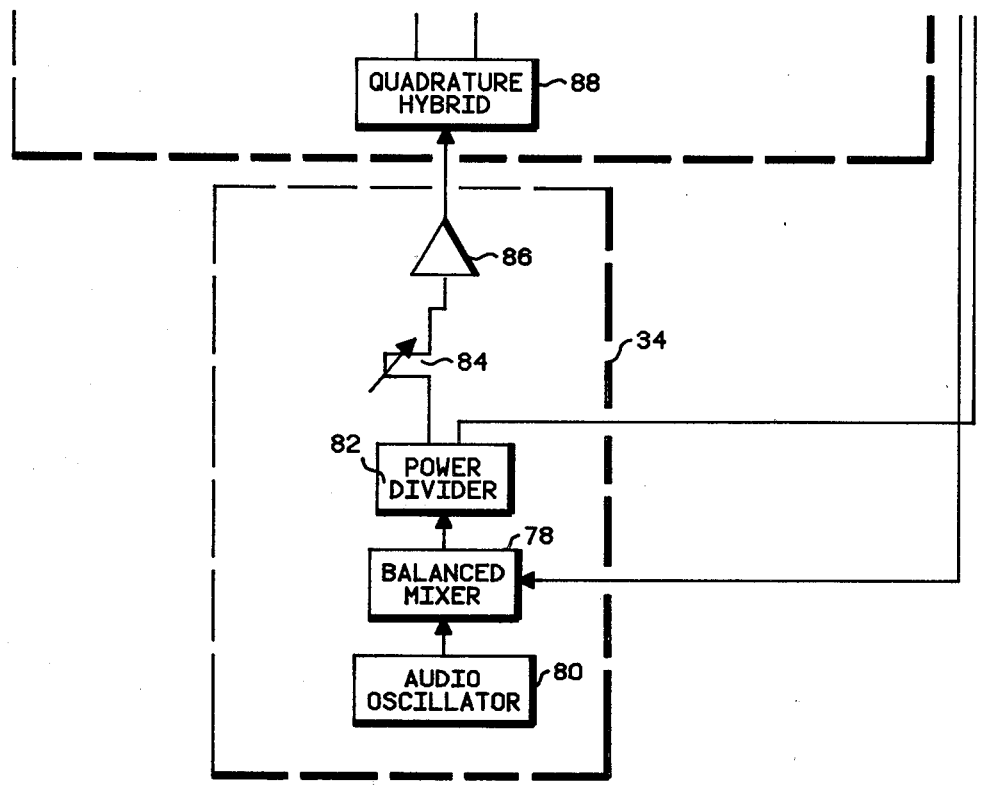

FIG. 3 is an expanded diagram of the circuit of FIG. 1 in which the components numbered in FIG. 1 are again shown. In FIG. 3, the signal that is amplified by RF amplifier 12 is sampled by directional coupler 16, and the sample is connected to amplitude and phase control unit 18. The amplitude of this signal is first reduced by an attenuator 56 which typically adds 17 dB of attenuation to the 10 dB attenuation of directional coupler 16. Relative phase of the signal is adjusted in trombone 58, after which the signal is taken to quadrature hybrid 60. The in-phase component of the signal from quadrature hybrid 60 is taken to weighter 62, and the quadrature component is taken to weighter 64. Weighters 62 and 64 are externally controllable attenuators, variable in amplitude and sign. Differences in attenuation of the quadrature components received by weighters 62 and 64 provides a controllable adjustment to the phase shift added by trombone 58. The result is to apply to summer 20 a signal that derives from the transmitted signal but that differs from the broadcast signal controllably in amplitude and phase. Because that signal is derived from the broadcast signal, it will contain tags. Summer 20 also receives an input signal from receiving antenna 10. Summer 20 comprises directional couplers 66 and 68 which are both 10 dB directional couplers, chosen to minimize the attenuation of the received signal from receiving antenna 10. The sum of the signals from receiving antenna 10 and weighters 62 and 64 is coupled to mixer 22 which comprises a cascade preselector 70, which is an amplifier and bandpass filter; a converter 72, and a crystal filter 74. The output of crystal filter 74 is amplified in IF amplifier 26 and applied to power divider 76. This is a four-way power divider that combines the functions of directional couplers 28 and 32 of FIG. 1.

One output of power divider 76 carries the main signal to directional coupler 36. A second output of power divider 76 is connected to tag generator 34 where it is combined in balanced mixer 78 with a signal from an audio oscillator 80 to produce the desired modulation containing two sidebands with the carrier suppressed. If audio oscillator 80 is set at 200 Hz, a typical value, the output of balanced mixer 78 will be a signal that is represented by a spectrum showing one tag 200 Hz above the carrier frequency and one tag 200 Hz below. This is the tag signal that is split in power divider 82 and added to the transmitted signal in directional coupler 36. The tag from power divided 82 is also coupled through trombone 84 to adjust its phase, and it is amplified in amplifier 86 before being delivered to tag sensor 30. In tag sensor 30 the tag signal is coupled to a quadrature hybrid 88. The in-phase and quadrature outputs from quadrature hybrid 88 are supplied as inputs to correlators 90 and 92 respectively. Correlators 90 and 92 also receive as inputs an output of power divider 76 that is amplified in AGC amplifier 94 and split in power divider 96. The output of correlator 90 is integrated by integrator 98 and applied to control weighter 62. The output of correlator 92 is integrated in integrator 100 and is applied to control weighter 64. Correlators 90 and 92 are balanced mixers or their equivalents. The inputs to correlators 90 and 92 are respectively signals containing tags only and signals that may contain tags from spillover.

If the signal from power divider 96 contains no tags, there will be no DC output from correlators 90 and 92 and hence nothing to integrate in integrators 98 and 100. The DC output represents the difference of equal frequencies. Weighters 62 and 64 will then maintain their present values of attenuation. However, if the signal from power divider 96 contains tag, the tagged signal combines in correlators 90 and 92 with the tagged signals supplied from quadrature hybrid 88. This will generate outputs from correlators 90 and 92 with the relative amplitudes of the two outputs depending upon the phase. The outputs from correlators 90 and 92 are integrated in integrators 98 and 100 and supplied as feedback to weighters 62 and 64 to adjust the amplitude and phase of the cancellation signal that is supplied to summer 20. It is evident that cancellation of the signal containing the tags will thus result in cancellation of the spillover signal, leaving only the signal received at receiving antenna 10 that contains no tags.

The circuit of FIG. 3 has been used in a single-frequency repeater at a broadcast frequency of 815 MHz. The signal that was repeated contained frequency modulation at the standard land-mobile specification of a frequency deviation of 5 KHz above and below the carrier. Tags were added to the IF to generate frequencies of 200 Hz above and below the IF frequency. The system was observed to produce an effective isolation of 100 dB. It was also observed that the system was substantially adapted with no signal input. The internally generated thermal noise in the mixers and amplifiers was modulated in the tag generator, producing two noise sidebands. These were acted upon by the system just as if they were a very small, noisy signal. The noise plus the two noise tags were radiated by the transmitting antenna, received by the receiving antenna, and correlated in the correlators to produce control voltages for the weighters. Because the noise signal was at such a low level, the control voltages were noisy. They caused the weighters to be very close to adaptation, and the effect of an arriving signal with modulation was then to improve the adaptation, and hence the amount of electronic isolation produced by the circuit.

While these results were achieved with FM broadcasts, the system is applicable to any form of modulation, including AM, single-sideband AM, with or without a carrier; narrow-band or wide-band FM, or any form of digital modulation. It is conceivable that some forms of digital modulation might create characteristic spectral peaks near the tag frequency. In such a case, it would be a simple matter to change the frequency of an audio oscillator to shift the tag frequency to a location in the spectrum of the received signal that left the tag unambiguously detectable. It should be emphasized that the system is operable with the tag frequency contained in the signal spectrum provided only that there is not a persistently repeated peak in that spectrum that interferes with the tag.

We claim:

1. A method of minimizing spillover in a same-frequency repeater comprising the steps of:
   a. receiving a signal at a given RF frequency;
   b. converting the signal to an IF frequency;
   c. combining a tag signal with the signal at the IF frequency to generate a tagged IF signal;
   d. converting the tagged IF to a tagged RF signal at the given RF frequency;
   e. amplifying the tagged RF signal to produce an amplified tagged RF signal;
   f. broadcasting the amplified tagged RF signal;
   g. detecting a tag in the IF signal; and
   h. combining a variable phase and amplitude cancelling RF signal derived from the amplified tagged RF signal with the received signal to minimize the amount of detected tag.

2. The method of claim 1 wherein the step of combining a tag signal with the signal at the IF frequency comprises adding to the signal at the IF frequency a signal having double-sideband suppressed-carrier modulation about a carrier frequency of the IF frequency.

3. A same-frequency repeater comprising:
   a. means for receiving a signal at a given RF frequency;
   b. means for converting the received signal to an IF frequency;
   c. means for combining a tag signal with the IF frequency to generate a tagged IF signal;
   d. means for converting the tagged IF signal to a tagged RF signal at the given RF frequency;
   e. means for amplifying the tagged RF signal to produce an amplified tagged RF signal;
   g. means for transmitting the amplified tagged RF signal;
   h. means for detecting a tag in the received IF signal; and
   i. means for combining a variable phase and amplitude cancelling RF signal derived from the amplified tagged RF signal with the received signal to reduce the amount of detected tag.

4. An apparatus for minimizing spillover from a transmitting port to a receiving port of a same-frequency repeater, the apparatus comprising:
   a. an IF amplifier having an input and an output;
   b. a tag generator producing a signal that is combined with an output signal from the IF amplifier to produce a tagged IF signal;
   c. a local oscillator;
   d. a mixer connected to the local oscillator and to the output of the IF amplifier to produce a tagged RF signal;
   e. an RF amplifier connected to the first mixer and to the transmitting port to amplify and broadcast the tagged RF signal;
   f. a summer connected to the receiving port to sum an input signal from the receiving port;
   g. a second mixer connected to an output of the summer, to the local oscillator, and to the IF amplifier to produce an IF signal at the input of the IF amplifier;
   h. a tag sensor connected to the output of the IF amplifier and to the tag generator to detect a tag in the IF signal and generate an output signal in response to that tag; and
   i. an amplitude and phase control unit connected to the tag sensor, the RF amplifier, and the summer to produce at the summer a cancelling signal at the frequency of the tagged RF signal and varying in amplitude and phase from the tagged RF signal in amounts controlled by the output signal from the tag sensor.

5. The apparatus of claim 4 wherein the tag generator comprises:
   an audio oscillator;
   a double-balanced mixer connected to the audio oscillator and to the output of the IF amplifier, the mixer receiving as a first input an audio signal from the audio oscillator and as a second input an IF signal to produce as an output a tagged IF signal having double-sideband suppressed-carrier modulation.

* * * * *